Figure 1:
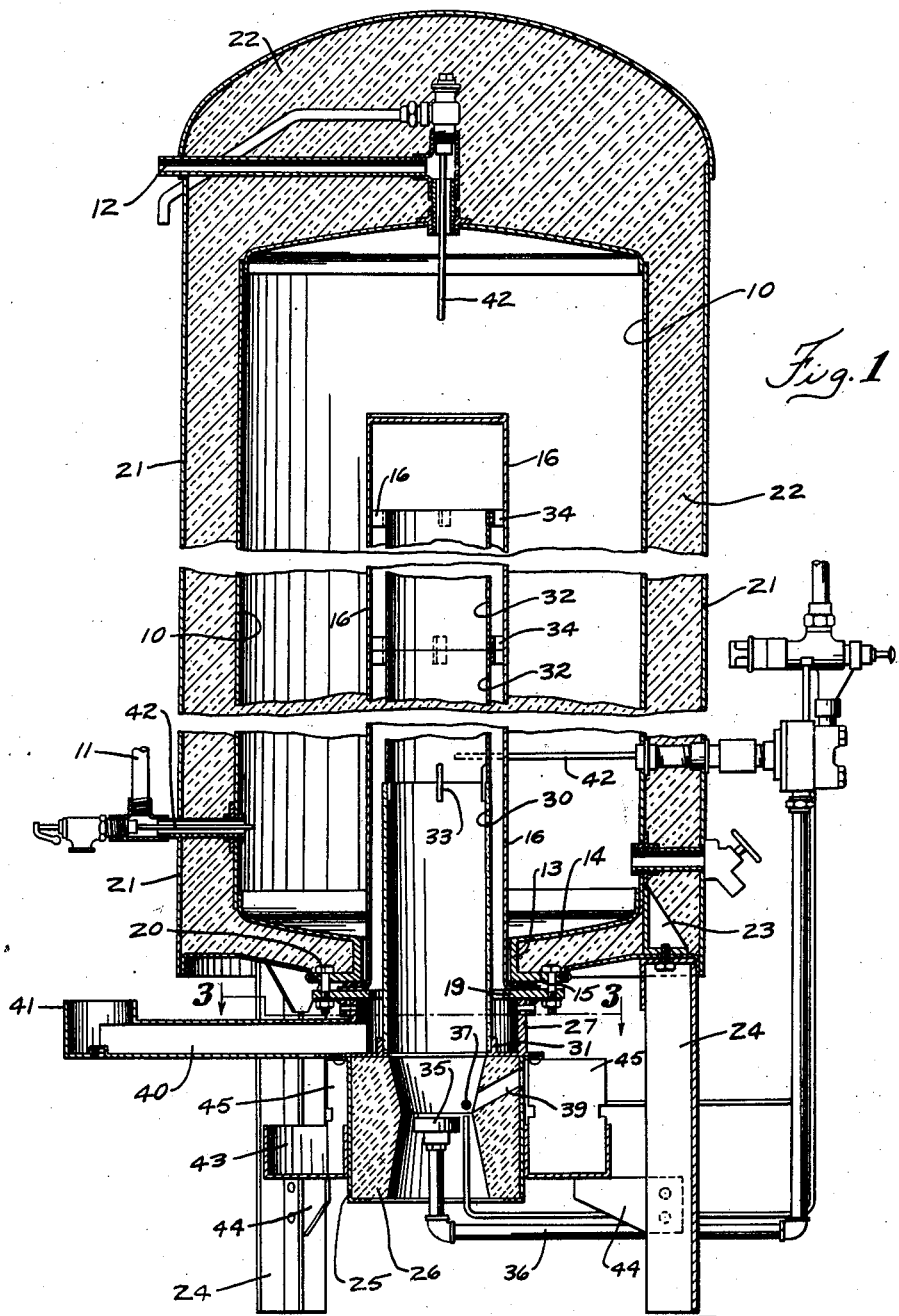

Oct. 20, 1942.  W. I. BATTIN  2,299,122
GAS WATER HEATER
Filed March 21, 1940  2 Sheets-Sheet 2
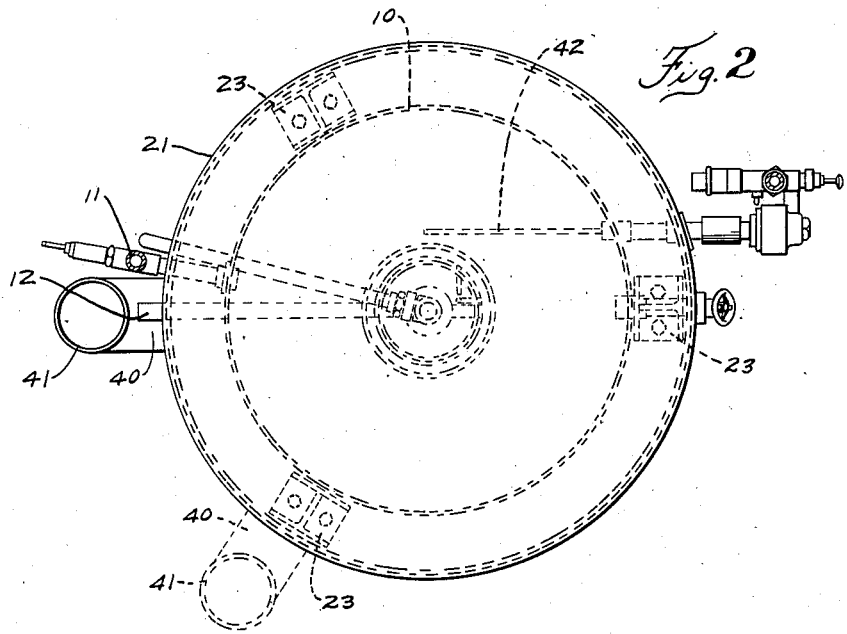
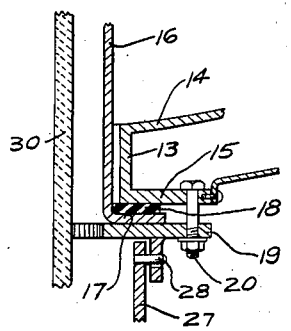
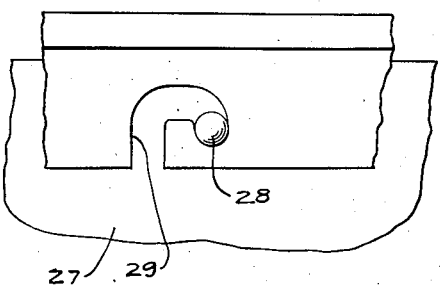
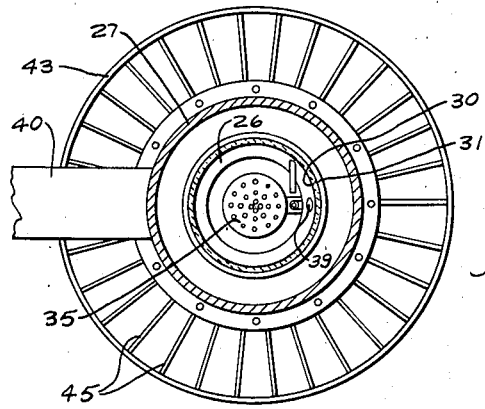
INVENTOR
WILLIAM I. BATTIN,
BY
ATTORNEYS Patented Oct. 20, 1942

2,299,122

UNITED STATES PATENT OFFICE 2,299,122

GAS WATER HEATER

William I. Battin, Indianapolis, Ind.

Application March 21, 1940, Serial No. 325,094

1 Claim. (Cl. 122—14)

This invention relates to water heaters employing gas as the heating means. It is a primary object of the invention to provide a heater structure wherein the greatest amount of water may be heated with the least amount of gas or in other words, that will have a greater over-all efficiency as compared to the heretofore employed types of heaters, the idea, of course, being to obtain the lowest possible cost for gas per unit of water heated.

Keeping in mind the fundamental purpose of achieving a greater efficiency in use of fuel, it is a further object to provide a structure wherein the gas burner is located in such a manner that the operation of the burner as well as of the lighting pilot burner may be readily observed and at the same time heat will not be radiated laterally or downwardly in respect to the burner to be lost beyond effective use in heating the water.

The invention further includes many novel features such as a detachable combustion chamber; means for directing incoming air directly toward and around the gas burner with means for limiting possibilities of back draft; and means for easy cleaning of internal flues.

While it is possible to employ the Bunsen type burner, the luminous flame type burner is preferred in order to prevent the popping back of the flame that frequently happens upon lighting or reducing the gas supplied to the Bunsen type burner. Furthermore, the luminous flame burner permits flame travel upwardly within the heater itself, as will hereinafter more fully appear, so that a better heat placement may be obtained.

These and many other objects and advantages of the invention will become apparent to those versed in the art in the following description of the invention as illustrated in the accompanying drawings, in which Fig. 1 is a central vertical section through a structure embodying the invention;

Fig. 2, a top plan view;

Fig. 3, a transverse section on the line 3—3 in Fig. 1;

Fig. 4, a detail in section on an enlarged scale of one form of lower tank end construction; and Fig. 5, a detail in outside elevation on a still further enlarged scale of the combustion chamber attaching means.

Like characters of reference indicate like parts throughout the several views in the drawings.

Referring to the form of the invention as illustrated in Figs. 1-5, a water tank 10 is formed in the usual manner to have a cold water inlet pipe connection 11 and an outlet water pipe 12, all mounted in the usual manner. Where it is desired to have a coating on the interior wall of the tank, such as porcelain or one of the synthetic resins or the like, the lower end of the tank would be formed with a bottle neck structure, herein shown as having a collar 13 extending downwardly from the tank head 14 with a lower connecting flange 15. A pipe 16 closed at its upper end is inserted through the collar 13 to project axially within the tank 10 to terminate by its closed end while above the mid-point of the tank.

The lower end of the pipe 16 carries an outturned flange 17, Fig. 4. A sealing gasket 18 is placed between the flange 15 and the flange 17 and a plate 19 is drawn upwardly to compress the gasket 18 between the flanges 15 and 17 by any suitable means, such as the bolts 20. In this manner, the pipe 16 forms the closure of the tank 10.

An outer shell 21 is provided to extend circumferentially around the tank 10, over the top of the tank and around under the bottom of the tank, all in spaced relation so as to receive a considerable quantity of heat insulating material 22 so as to present escape of any appreciable amount of heat. In the form herein shown, the tank 10 is supported through brackets 23 attached to the tank and connecting respectively with a plurality of legs 24, herein shown as three in number.

A separate combustion chamber is formed and in the drawing is shown to consist of a cylindrical metallic shell 25 within which is carried a refractory lining 26 in the nature of a doughnut. The lower end of the shell 25 is turned inwardly to form a support for the lining 26. This lining 26 has a passageway extending axially therethrough, and is preferably formed in the shape of a Venturi tube. The shell 25 is secured against the under side of a mounting collar 27 and this collar in turn is provided with some suitable means for being detachably engaged with the plate 19. Such means may take the form of a bayonet connection wherein the collar 27 may carry a number of pins 28 to engage within slots 29, Fig. 5, to permit the collar 27 to be rotated slightly and carry the pins over into a slot terminating seat.

A cylindrical tube 30 is located by any suitable means to be axially aligned with the passageway through the refractory lining 26, preferably by being seated within an annular projection above the lining 26, herein shown as within an annular rib 31 turned upwardly from an inner extension of the collar 27. This tube 30 is made out of a heat insulating material of a refractory nature and has an external diameter less than the internal diameter of the tube 16 so that an annular space is provided between the two tubes.

On the upper end of the tube 30 is mounted a number of sections 32 of tubing, herein shown as two in number, these sections being preferably of the same diameter internally as that of the tube 30 and may be made out of metal. The number of sections 32 depends upon the height of the tube 16 and also the length of the supporting legs 24 as will become apparent hereinafter. In any event, each of the sections 32 is demountable in respect to the lower tube 30 and also in respect to any other section 32. Also the lower section 32 is centered and aligned with the tube 30 by any suitable means, such as by fingers 33 fixed to that section 32 and extending downwardly within the tube 30. In order to maintain a uniform annular spacing around the sections 32 from the pipe 16, spacing fins 34 are provided on the sections to extend downwardly into contact with the pipe 16. The upper end of the last section 32 is spaced downwardly from the top closed end of the pipe 16, as illustrated in Fig. 1.

A suitable gas burner 35 is mounted to be substantially at the throat of the passageway through the refractory lining 26, Fig. 1, that is, to be at that part of the passageway having the least diameter. The burner, of course, may be inserted within the passageway by entering it from the under side and the gas conducting pipe 36 carried downwardly and away therefrom to the source of gas supply. A pipe is carried through the lining 26 to terminate as a pilot burner 37 adjacent the burner 35 and a lighting tube 38 is, in the present form, carried upwardly through the passageway of the lining 26 to terminate in close proximity to the pilot burner 37 for ignition purposes. The lining 26 is provided with a small passageway 39 located in such manner that the pilot burner 37 as well as the burner 35 may be viewed therethrough without the operator having to get down on the floor and look upwardly in the passageway in the lining 26. Moreover this observation passageway 39 is restricted in diameter so that any accidental explosion of gases will not blow therethrough into the face of the operator, the face of the operator being removed to quite a distance therefrom by reason of the fact that the passageway 39 is inclined upwardly to permit sight of the burners from a much higher elevation.

In reference to the mounting of the tube 30, it is pointed out that there is an annular space provided between the collar 27 and the tube 30 around the lower end of that tube. A flue connecting pipe 40 is carried laterally from the collar 27 to provide a gas discharge passageway from this space within the collar 27, the pipe 40 preferably having an upturned flue pipe connecting collar 41.

The pilot burner 37 is normally kept burning continuously and flow of gas to the burner 35 is controlled in the usual and well known manner automatically in accordance with the temperature of the water within the tank 10 by the usual thermostatic controls. The controls themselves per se do not enter into the present invention and it is sufficient to state that in my form of the invention, particularly with the employment of a luminous type burner 35, gas may be supplied to the burner 35 by the usual "snap-on" thermostatically operated gas valve and then if further gas is required, a thermostatic graduating unit may be employed to increase that gas flow. Such controls are, of course, optionally set up but in any event are actuated by thermostat members 42, herein indicated, Fig. 1, in three suggested locations.

In any event, when there is a call for gas, the burner 35 is ignited upon gas flow thereto by the pilot burner 37. Since the burner 35 is mounted to be at the restricted diameter portion of the passageway through the refractory lining 26, air entering that passageway from the open under side is directed toward and around the burner 35 so that the flow of air is immediately therearound and in an upward direction without any excess space being left for eddy currents or down draft effects. Then it is to be noted that the passageway through the lining 26 flares outwardly and upwardly to reach a diameter substantially that of the tube 30. Products of combustion along with the heated air rise within the tube 30, tube sections 32, and then are carried downwardly within the pipe 16 through the restricted annular space between that pipe and the tube sections 32 and tube 30 to discharge within the collar 27 from which escape is had through the flue pipe 40. It is to be noted that the plate 19 has a central hole therethrough, the diameter of which hole is at least as great as the internal diameter of the pipe 16.

Since the greatest intensity of heat is immediately above the burner 35 and continues for a short distance thereof, then heat will be confined in respect to lateral directions within the tube 30 so that the only escape is upwardly. In other words the tube 30 prevents loss of heat in that zone to down-coming gases externally of the tube and within the pipe 16, this part of the pipe 16 being normally the coolest part thereof since the cold water enters the tank 10 near the bottom and the hottest part of the water is always at the top. Thus it is to be seen that no effective heat transfer is had as between upwardly rising and downwardly traveling columns of gases within the lower part of the tank and that the heat is conducted upwardly where it is quickly transferred to that part of the water in the upper part of the tank so that hot water may be had very quickly even in an initially cold tank following the first operation of the burner 35.

Where heat is utilized by causing a return flow of gases within the tank itself, some condensation of vapors to water is occasionally had. The condensate will collect within the collar 27 or possibly to some extent in the discharge pipe 40. The condensate may escape through suitably provided holes 46 to drip into a collector pan 43 which extends annularly around the combustion chamber shell 25 to be supported by brackets 44 extending inwardly from the respective legs 24. Normally the condensate so collected will evaporate about as fast as it reaches the pan 43 but in order to take care of any excessive condensation, the pan 43 is preferably provided with a plurality of upturned evaporating plates 45 made out of any suitable absorptive material, such as unglazed porcelain, the idea being to cause the water to travel upwardly on these plates and thus be spread out over a greater surface for evaporation.

After usage over considerable lengths of time, it may become necessary for the best transfer of heat to clean out the interior of the pipe 16 and also the tube 30 and sections 32. In order to do this, the burner 35 is dropped down and turned out of the way whereupon the combustion chamber shell 25 may be lifted and revolved sufficiently to disengage the mounting pins 28 from the seats within the slots 29. The shell 25 with its lining and the tube 30 and tubular sections 32 thereabove may then be dropped downwardly. The legs 24 have considerable lengths to permit the removal of the combustion chamber first and then the removal secondly of the insulating pipe 30 and thereafter each of the sections 32, one after another, the sections being provided for this purpose in order to facilitate removal from the under side of the tank since it would be impossible to remove that inner tube were it made in one section without having to lift the entire tank or turn it over. The tubes so removed may, of course, be readily cleaned and access is had to within the pipe 16 for cleaning it. Of course, where there is excessive liming, and a coating builds up on the external surface of the pipe 16, this pipe may be readily replaced when the type of structure shown in Fig. 1 is employed.

Thus it is to be seen that in the form of the invention thus far described, the burner itself is immediately surrounded by sufficient insulation to prevent radial escape of heat and furthermore, downward escape of heat by reason of the peculiar formation of the lining 26, and the location of the burner 35 within that lining.

It is contemplated that the gas burner will operate only at times when the water within the tank drops below a predetermined temperature so that there will be only an intermittent operation of the burner automatically as called for by the temperature of the water. Between operations of the burner, the hot water will be stored within the tank and kept at an elevated temperature by reason of sufficient heat insulation being supplied around the water tank.

While I have herewith shown and described my invention in the best form as now known to me, it is obvious that structural changes may be employed without departing from the spirit of the invention and I, therefore, do not desire to be limited to that precise form beyond the limitations as may be imposed by the following claim.

I claim:

In a water heater, a water tank, heat insulation about the tank, a gas burner chamber below the tank, heat insulation around said chamber exceeding that of said tank, a gas burner carried in the chamber, said chamber having an under air admittance port, a closed upper end tube entering said tank from its bottom with a water tight connection therebetween and extending upwardly therein well toward its top, and a second tube open at its top end and connecting with a discharge port of said burner chamber and telescoping within said first tube in spaced relation therewith to provide a gas passage from the second tube top end down through the first tube, said second tube being made in detachable sections, and legs supporting said water tank, said legs having lengths in accordance with lengths of said tube sections to permit withdrawal and replacement of the sections without disturbing said tank, the lowermost of said tube sections being made out of a heat insulating material.

WILLIAM I. BATTIN.